US008553599B2

United States Patent
Aoyagi et al.

(10) Patent No.: US 8,553,599 B2
(45) Date of Patent: Oct. 8, 2013

(54) MOBILE COMMUNICATION SYSTEM AND NETWORK DEVICE

(75) Inventors: Kenichiro Aoyagi, Yokosuka (JP); Takaaki Sato, Kawasaki (JP)

(73) Assignee: NTT DoCoMo, Inc., Tokyo (JP)

(*) Notice: Subject to any disclaimer, the term of this patent is extended or adjusted under 35 U.S.C. 154(b) by 317 days.

(21) Appl. No.: 12/921,274

(22) PCT Filed: Mar. 5, 2009

(86) PCT No.: PCT/JP2009/054198
§ 371 (c)(1),
(2), (4) Date: Dec. 6, 2010

(87) PCT Pub. No.: WO2009/110565
PCT Pub. Date: Sep. 11, 2009

(65) Prior Publication Data
US 2011/0122841 A1    May 26, 2011

(30) Foreign Application Priority Data
Mar. 5, 2008    (JP) .................... 2008-055224

(51) Int. Cl.
*H04B 7/00* (2006.01)
(52) U.S. Cl.
USPC ............................................. 370/310
(58) Field of Classification Search
USPC ............... 455/403, 422.1, 436, 442; 370/310, 370/328, 329, 331
See application file for complete search history.

(56) References Cited

U.S. PATENT DOCUMENTS

| | | | |
|---|---|---|---|
| 6,301,478 B1* | 10/2001 | Wallstedt et al. | 455/436 |
| 7,142,861 B2* | 11/2006 | Murai | 455/444 |
| 7,302,266 B1* | 11/2007 | Sill et al. | 455/441 |
| 8,050,629 B2* | 11/2011 | Foster et al. | 455/63.1 |
| 8,121,089 B2* | 2/2012 | Bao et al. | 370/331 |
| 8,219,100 B2* | 7/2012 | Bao et al. | 455/444 |
| 2002/0041577 A1* | 4/2002 | Kim | 370/331 |
| 2004/0005897 A1* | 1/2004 | Tomoe et al. | 455/450 |
| 2005/0070283 A1 | 3/2005 | Hashimoto et al. | |
| 2005/0130662 A1* | 6/2005 | Murai | 455/444 |
| 2007/0097938 A1 | 5/2007 | Nylander et al. | |

(Continued)

FOREIGN PATENT DOCUMENTS

| | | |
|---|---|---|
| JP | 9-247079 | 9/1997 |
| JP | 2005 109570 | 4/2005 |
| WO | 2005 112490 | 11/2005 |
| WO | 2007 040450 | 4/2007 |

OTHER PUBLICATIONS

Japanese Office Action issued Apr. 17, 2012, in Japan Patent Application No. 2010-501960 (with English translation).

(Continued)

*Primary Examiner* — Fan Ng
(74) *Attorney, Agent, or Firm* — Oblon, Spivak, McClelland, Maier & Neustadt, L.L.P.

(57) ABSTRACT

A mobile communication system in which a home cell limits access from a first mobile station, and when the first mobile station communicating via a macro cell using the same frequency as the home cell enters a predetermined area near the home cell, the first mobile station is caused to perform handover to a different-frequency macro cell selected from among macro cells covering the predetermined area and using frequencies different from that used in the home cell.

11 Claims, 13 Drawing Sheets

(56) References Cited

U.S. PATENT DOCUMENTS

| | | |
|---|---|---|
| 2007/0097939 A1 | 5/2007 | Nylander et al. |
| 2007/0097983 A1 | 5/2007 | Nylander et al. |
| 2007/0105527 A1 | 5/2007 | Nylander et al. |
| 2007/0105568 A1 | 5/2007 | Nylander et al. |
| 2007/0183427 A1 | 8/2007 | Nylander et al. |
| 2007/0202866 A1* | 8/2007 | Tsuchiya ............ 455/422.1 |
| 2008/0102836 A1* | 5/2008 | Wang et al. ............ 455/436 |
| 2008/0188221 A1 | 8/2008 | Hashimoto et al. |
| 2008/0304494 A1 | 12/2008 | Yokoyama |
| 2009/0052395 A1* | 2/2009 | Bao et al. ............ 370/331 |
| 2011/0122841 A1* | 5/2011 | Aoyagi et al. ............ 370/331 |
| 2012/0149363 A1* | 6/2012 | Faerber et al. ............ 455/423 |

OTHER PUBLICATIONS

International Search Report issued Apr. 28, 2009 in PCT/JP09/54198 filed Mar. 5, 2009.

Office Action issued Dec. 19, 2012 in Chinese Patent Application No. 200980107789.8 with English language translation.

* cited by examiner

| HOME CELL | MOBILE STATION ALLOWED TO ACCESS |
|---|---|
| #a | UE#X, UE#Y |
| ⋮ | ⋮ |

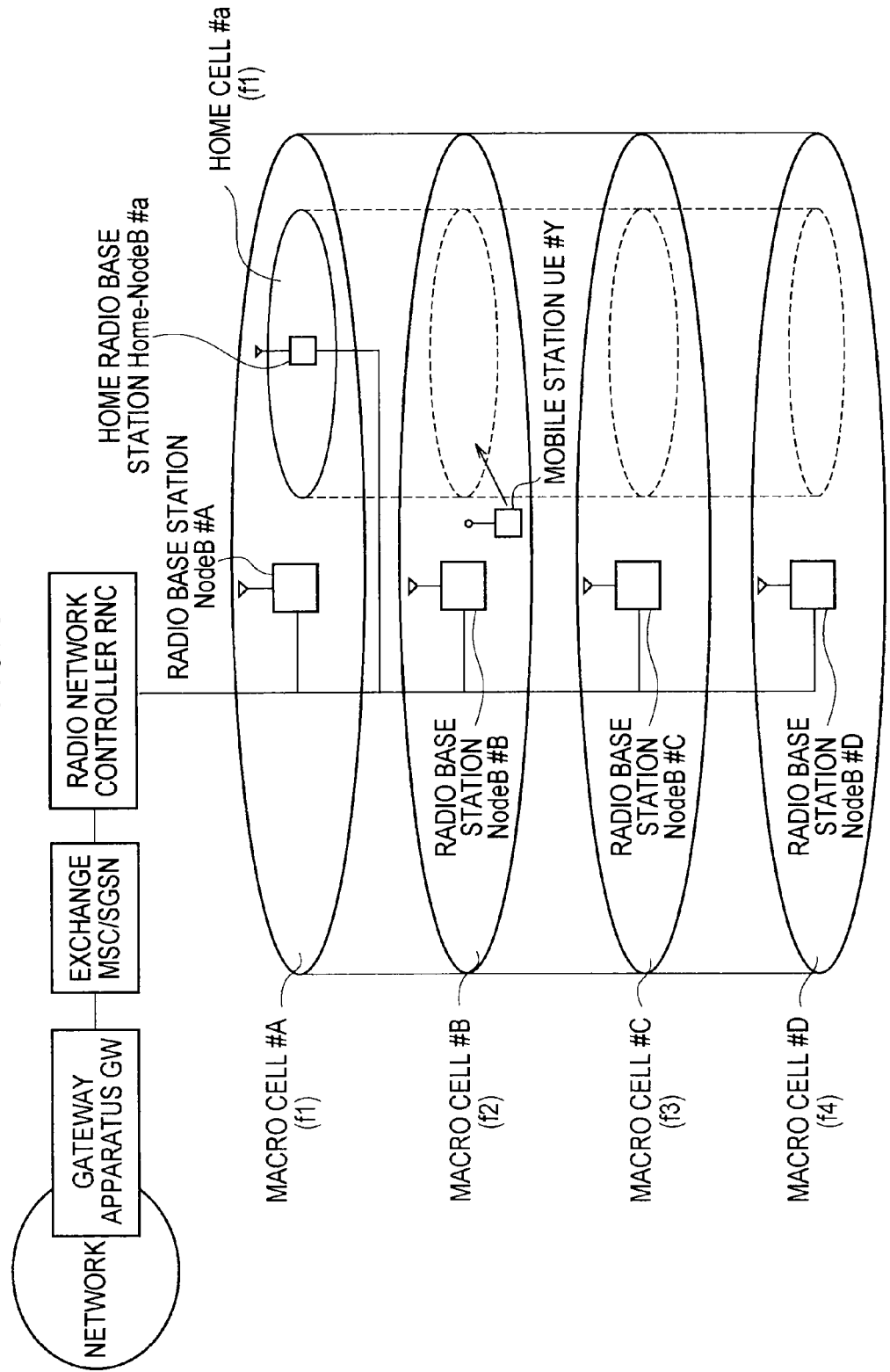

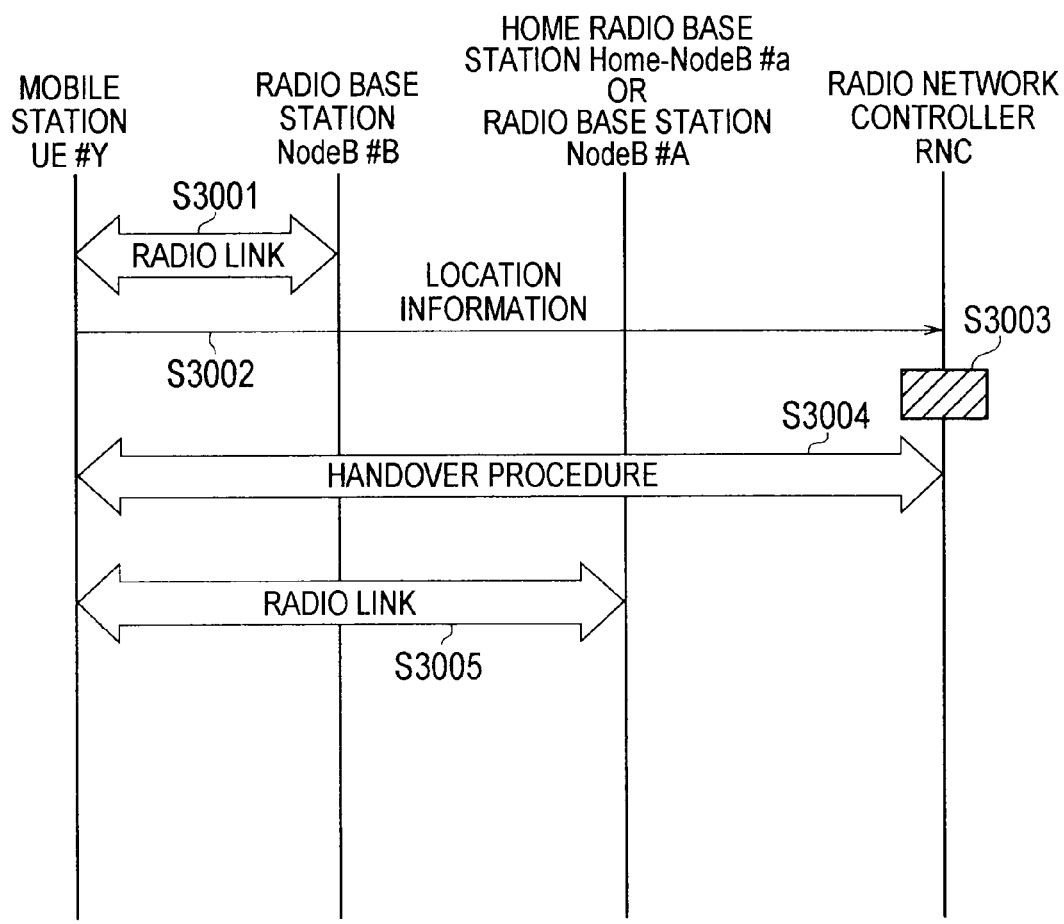

MOBILE COMMUNICATION SYSTEM AND NETWORK DEVICE

TECHNICAL FIELD

The present invention relates to a network device and a mobile communication system including a home cell which is configured to limit access from a first mobile station but to allow access from a second mobile station.

BACKGROUND ART

Generally, in a mobile communication system as shown in FIG. 18, a mobile station UE is configured to communicate via a core network in one of macro cells #11 to #32.

To be specific, the mobile station UE selects a macro cell to establish a radio link according to the communication quality and the like of each macro cell, establishes a radio link with a radio base station managing the selected macro cell, and uses the radio link to communicate via the core network.

While traveling, the mobile station UE can continuously communicate via the core network by appropriately switching from one cell to another to establish the radio link.

Recently, a mobile communication system is implemented in which, as shown in FIG. 19, a home cell only accessible by a specific mobile station UE is arranged in a coverage area of a macro cell accessible by a general mobile station UE.

Incidentally, a macro cell is managed by a radio base station NodeB for public communications, and a home cell is managed by a small radio base station (home radio base station Home-NodeB) located indoors, in a home or the like.

Here, a radio wave in the home cell works as an interference wave for the mobile station UE which cannot access the home cell, whereas a radio wave in a macro cell works as an interference wave for the specific mobile station UE which can access the home cell.

Hence, there has been a problem that designing of cells in a mobile communication system is limited because consideration needs to be given to set different frequencies for use in a home cell and a macro cell, or to locate a home cell and a macro cell so as not to be influenced by interference waves.

DISCLOSURE OF THE INVENTION

The present invention is made in view of the above problem, and aims to provide a mobile communication system and a network device which are capable of suppressing influence by interference waves between a home cell and a macro cell when the home cell is located within a coverage area of the macro cell, and promoting access to the home cell.

The first feature of the present invention relates to a mobile communication system including a home cell, wherein the home cell limits access from a first mobile station, and when the first mobile station communicating via a macro cell using the same frequency as the home cell enters a predetermined area near the home cell, the first mobile station is caused to perform handover to a different-frequency macro cell selected from among macro cells covering the predetermined area and using frequencies different from that used in the home cell.

In the first feature of the present invention, the home cell and a macro cell that may cover at least a part of a coverage area of the home cell are managed in association with each other, and the predetermined area may be an area covered by the macro cell managed in association with the home cell.

In the first feature of the present invention, the predetermined area may be an area whose distance to the home cell is not more than a predetermined threshold.

In the first feature of the present invention, the different-frequency macro cell may be selected depending on the number of home cells each overlapping therewith.

The second feature of the present invention relates to a mobile communication system including a home cell, wherein the home cell allows access from a second mobile station, and when the second mobile station communicating via a macro cell using a frequency different from that used in the home cell enters a coverage area of the home cell, the second mobile station is caused to perform handover to any one of the home cell and a macro cell using the same frequency as the home cell.

The third feature of the present invention relates to a network device used in a mobile communication system including a home cell configured to limit access from a first mobile station, the network device comprising a cell change instruction unit configured to, when the first mobile station communicating via a macro cell using the same frequency as the home cell enters a predetermined area near the home cell, make the first mobile station perform handover to a different-frequency macro cell selected from among macro cells covering the predetermined area and using frequencies different from that used in the home cell.

In the third feature of the present invention, a subordination manager may be configured to manage the home cell and a macro cell that covers at least a part of a coverage area of the home cell in association with each other, wherein the predetermined area is an area covered by the macro cell managed in association with the home cell.

In the third feature of the present invention, the predetermined area may be an area whose distance to the home cell is not more than a predetermined threshold.

In the third feature of the present invention, the cell change instruction unit may select the different-frequency macro cell depending on the number of home cells each having a coverage area overlapping therewith.

The fourth feature of the present invention relates to a network device used in a mobile communication system including a home cell configured to allow access from a second mobile station, the network device comprising a cell change instruction unit configured to, when the second mobile station communicating via a macro cell using a frequency different from that used in the home cell enters a coverage area of the home cell, make the second mobile station perform handover to any one of the home cell and a macro cell using the same frequency as the home cell.

The fifth feature of the present invention relates to a home radio base station managing a home cell configured to limit access from a first mobile station, the home radio base station comprising a cell change instruction unit configured to, when the first mobile station communicating via a macro cell using the same frequency as the home cell enters a predetermined area near the home cell, make the first mobile station perform handover to a different-frequency macro cell selected from among macro cells covering the predetermined area and using frequencies different from that used in the home cell.

In the fifth feature of the present invention, a subordination manager may be configured to manage the home cell and a macro cell that covers at least a part of a coverage area of the home cell in association with each other, wherein the predetermined area is an area covered by the macro cell managed in association with the home cell.

In the fifth feature of the present invention, the predetermined area may be an area whose distance to the home cell is not more than a predetermined threshold.

In the fifth feature of the present invention, the cell change instruction unit may select the different-frequency macro cell depending on the number of home cells each having a coverage area therewith.

BRIEF DESCRIPTION OF THE DRAWINGS

FIG. 9 is an entire configuration diagram of a mobile communication system according to a second embodiment of the present invention.

FIG. 10 is a diagram showing an example of a subordination managed by a subordination manager of a radio network controller according to the second embodiment of the present invention.

FIG. 11 is a sequence diagram illustrating a handover operation in the mobile communication system according to the second embodiment of the present invention.

BEST MODES FOR CARRYING OUT THE INVENTION (Configuration of Mobile Communication System According to First Embodiment of Present Invention)

With reference to FIGS. 1 to 4, a description is given of a configuration of a mobile communication system according to a first embodiment of the present invention.

Figure 1:
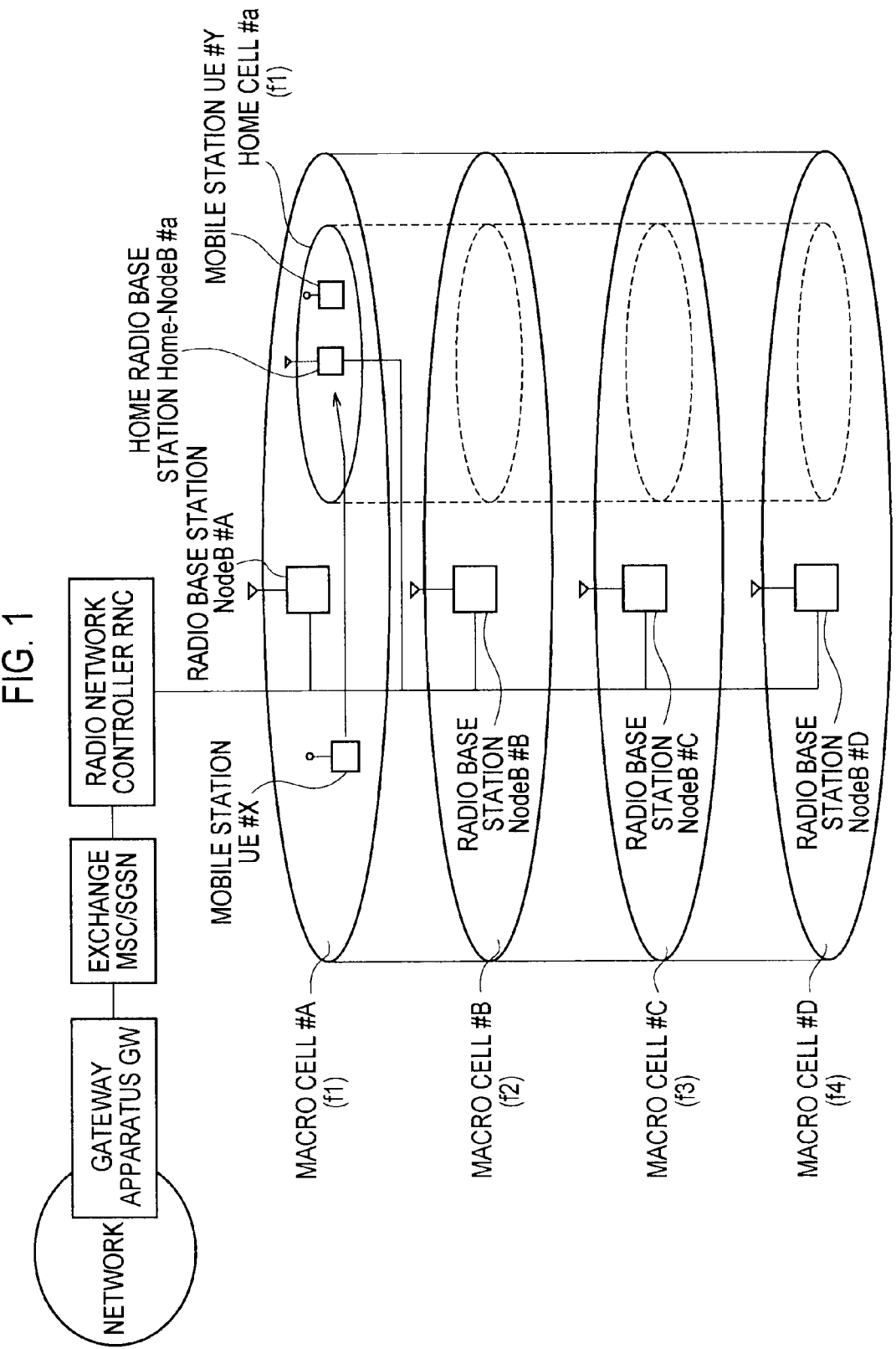
FIG. 1 is an entire configuration diagram of a mobile communication system according to a first embodiment of the present invention.

As shown in FIG. 1, the mobile communication system according to this embodiment includes a gateway apparatus GW connected to a network, an exchange MSC/SGSN, a radio network controller RNC, radio base stations NodeB #A to NodeB #D, a home radio base station Home-NodeB #a, and mobile stations UE #X and UE #Y.

In this embodiment, a macro cell #A managed by the radio base station NodeB #A uses a frequency f1, a macro cell #B managed by the radio base station NodeB #B uses a frequency f2, a macro cell #C managed by the radio base station NodeB #C uses a frequency f3, and a macro cell #D managed by the radio base station NodeB #D uses a frequency f4.

Meanwhile, a home cell #a managed by the home radio base station Home-NodeB #a uses the frequency f1 which is the same frequency as the macro cell #A uses.

Note that the home cell #a is configured to limit access from the mobile station UE #X (first mobile station), and to allow access from the mobile station UE #Y (second mobile station UE).

The radio network controller RNC of this embodiment functions as a network device including a location information acquisition unit 11, an access list manager 12, a subordination manager 13, a determination unit 14 and a cell change instruction unit 15.

The location information acquisition unit 11 is configured to acquire location information on the mobile station UE.

For example, the location information acquisition unit 11 may be configured to acquire location information on the mobile station UE by use of a GPS positioning result, a measurement result of propagation delay between the radio base station NodeB and the mobile station UE, or the like.

In addition, the location information acquisition unit 11 may be configured to compute location information on the mobile station UE according to location information on the radio base station NodeB with which the mobile station UE establishes a radio link.

For example, if the mobile station UE establishes radio links with multiple radio base stations NodeB, the location information acquisition unit 11 may acquire an intermediate point among the pieces of location information on multiple radio base stations NodeB as location information on the mobile station UE.

Figures 2, 3:
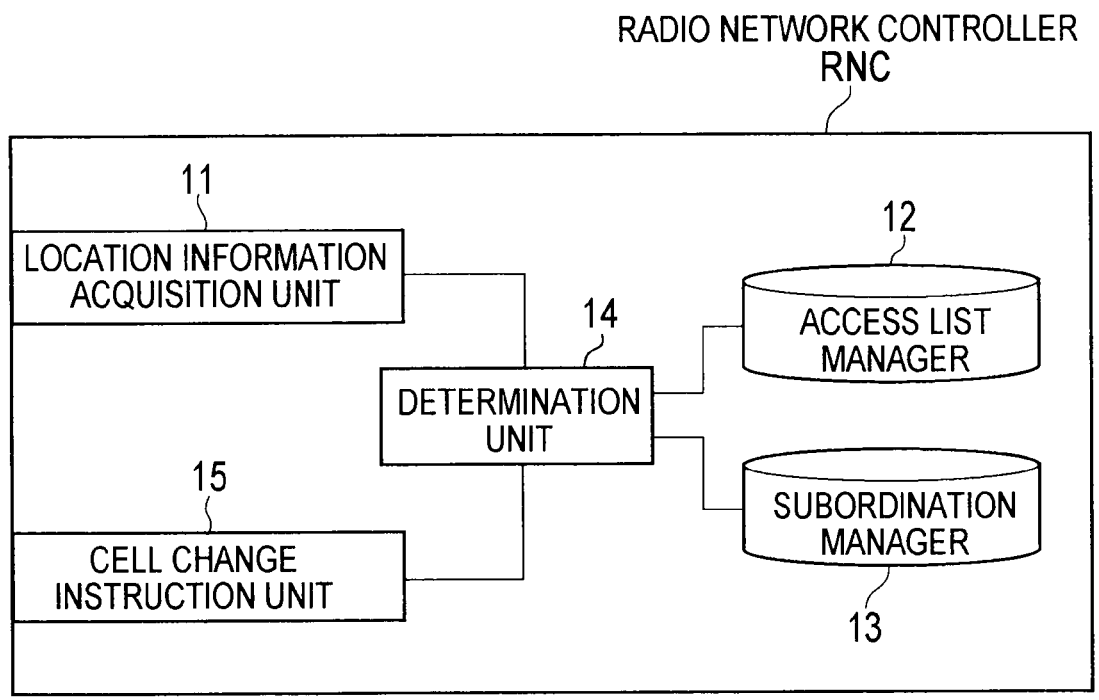
FIG. 2 is a functional block diagram of a radio network controller according to the first embodiment of the present invention.
FIG. 3 is a diagram showing an example of an access list managed by an access list manager of the radio network controller according to the first embodiment of the present invention.

As shown in FIG. 3, the access list manager 12 is configured to manage a list of accessible mobile stations (access list) for each home cell. Incidentally, the access list manager 12 may be configured to manage a list of mobile stations whose access is limited (access limitation list) for each home cell.

Figures 4, 5:
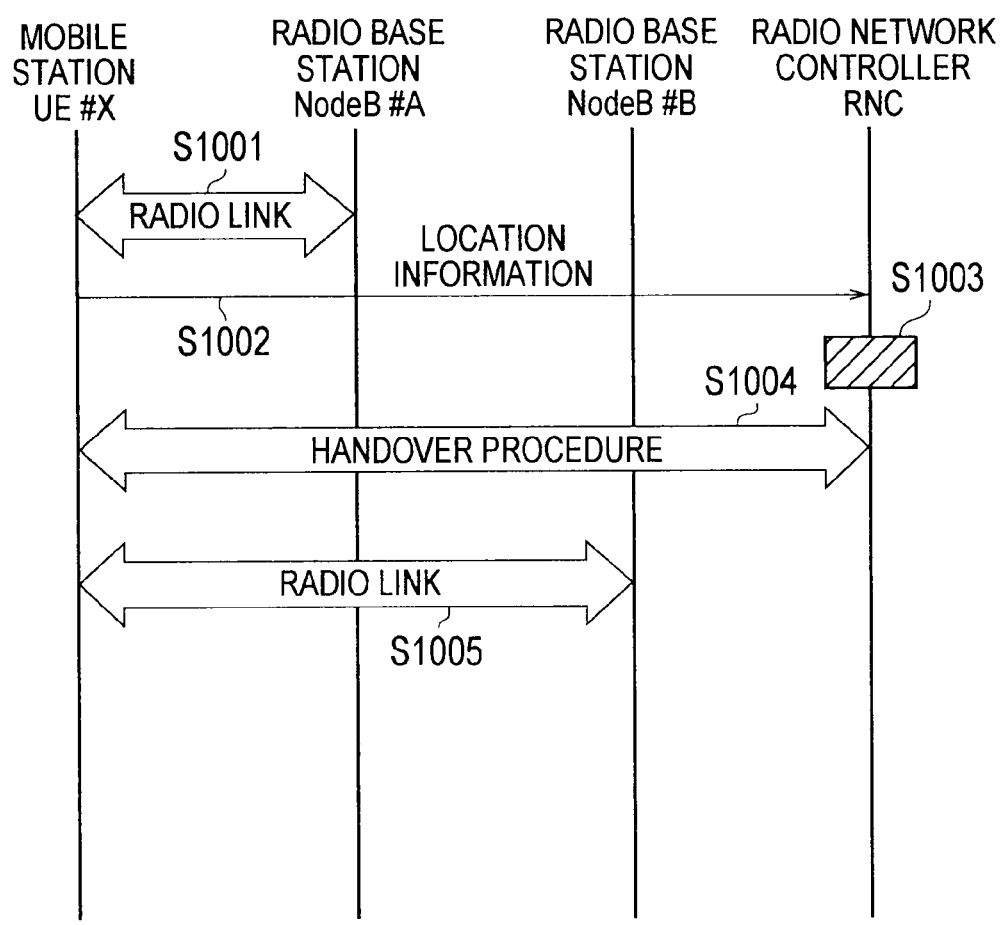
FIG. 4 is a diagram showing an example of a subordination managed by a subordination manager of the radio network controller according to the first embodiment of the present invention.
FIG. 5 is a sequence diagram illustrating a handover operation in the mobile communication system according to the first embodiment of the present invention.

As shown in FIG. 4, the subordination manager 13 is configured to manage each home cell in association with a macro cell that covers at least a part of the coverage area of the home cell. Here, the subordination manager 13 is configured to identify each cell (macro cell and home cell) by use of a cell ID or a scrambling code.

The determination unit 14 is configured to determine whether or not the mobile station UE #X communicating via the macro cell #A using the same frequency f1 as the home cell #a has entered a predetermined area near the home cell #a.

For example, the determination unit 14 may set, as the predetermined area, an area covered by the macro cell #A managed in association with the home cell #a by the subordination manager 13.

In addition, the determination unit 14 may be configured to determine whether or not the mobile station UE #X communicating via the macro cell #A using the same frequency f1 as the home cell #a has entered a predetermined area near the home cell #a, according to location information on the mobile station UE #X acquired by the location information acquisition unit 11. In this case, the determination unit 14 may set, as the predetermined area, an area whose distance to the home cell #a is not more than a predetermined threshold.

Incidentally, the determination unit 14 may be configured to make this determination when the mobile station UE starts communication in the macro cell #A (i.e., when the mobile station UE establishes a radio link with the macro cell #A).

In addition, the determination unit 14 may be configured to make this determination when the mobile station UE performs handover to the macro cell #A.

Moreover, the determination unit 14 is configured to determine whether or not the mobile station UE #Y communicating via the macro cell #A using the same frequency f1 as the home cell #a has entered a coverage area of the home cell #a.

When it is determined that the mobile station UE #X communicating via the macro cell #A using the same frequency f1 as the home cell #a has entered the predetermined area near the home cell #a, the cell change instruction unit 15 is configured to make the mobile station UE #X perform handover (hard handover) to a different-frequency macro cell. This different-frequency macro cell covers the above-mentioned predetermined area and is selected from among the macro cells #B to #D using frequencies f2 to f4 which are different from the frequency used in the home cell #a.

Note that the cell change instruction unit 15 may be configured to select the different-frequency macro cell, depending on the number of home cells each having a coverage area overlapping therewith.

In addition, when it is determined that the mobile station UE #Y communicating via the macro cell #A using the same frequency f1 as the home cell #a has entered the coverage area of the home cell #a, the cell change instruction unit 15 is configured to make the mobile station UE #Y perform handover (hard handover) to the home cell #a.

(Operation of Mobile Communication System According to First Embodiment of Present Invention)

With reference to FIGS. 5 to 8, a description is given of an operation of the mobile communication system according to the first embodiment of the present invention.

Firstly with reference to FIG. 5, a description is given of an operation carried out when the mobile station UE #X (first mobile station) communicating via the macro cell #A using the same frequency f1 as the home cell #a enters the predetermined area near the home cell #a.

As shown in FIG. 5, in step S1001, the mobile station UE #X has already established a radio link with the radio base station NodeB #A that manages the macro cell #A using the same frequency f1 as the home cell #a.

In step S1002, the mobile station UE #X notifies the radio network controller RNC of location information on the mobile station UE #X at a predetermined timing.

After determining in step S1003 that the mobile station UE #X has entered the predetermined area near the home cell #a, the radio network controller RNC instructs the mobile station UE #X in step S1004 to perform handover (hard handover) to the macro cell #B which covers the predetermined area and which uses the frequency f2 different from that used in the home cell #a.

Then, in step S1005, in response to this instruction, the mobile station UE #X releases the radio link established with the radio base station NodeB #A that manages the macro cell #A, and establishes a radio link with the radio base station NodeB #B that manages the macro cell #B.

Figure 6:
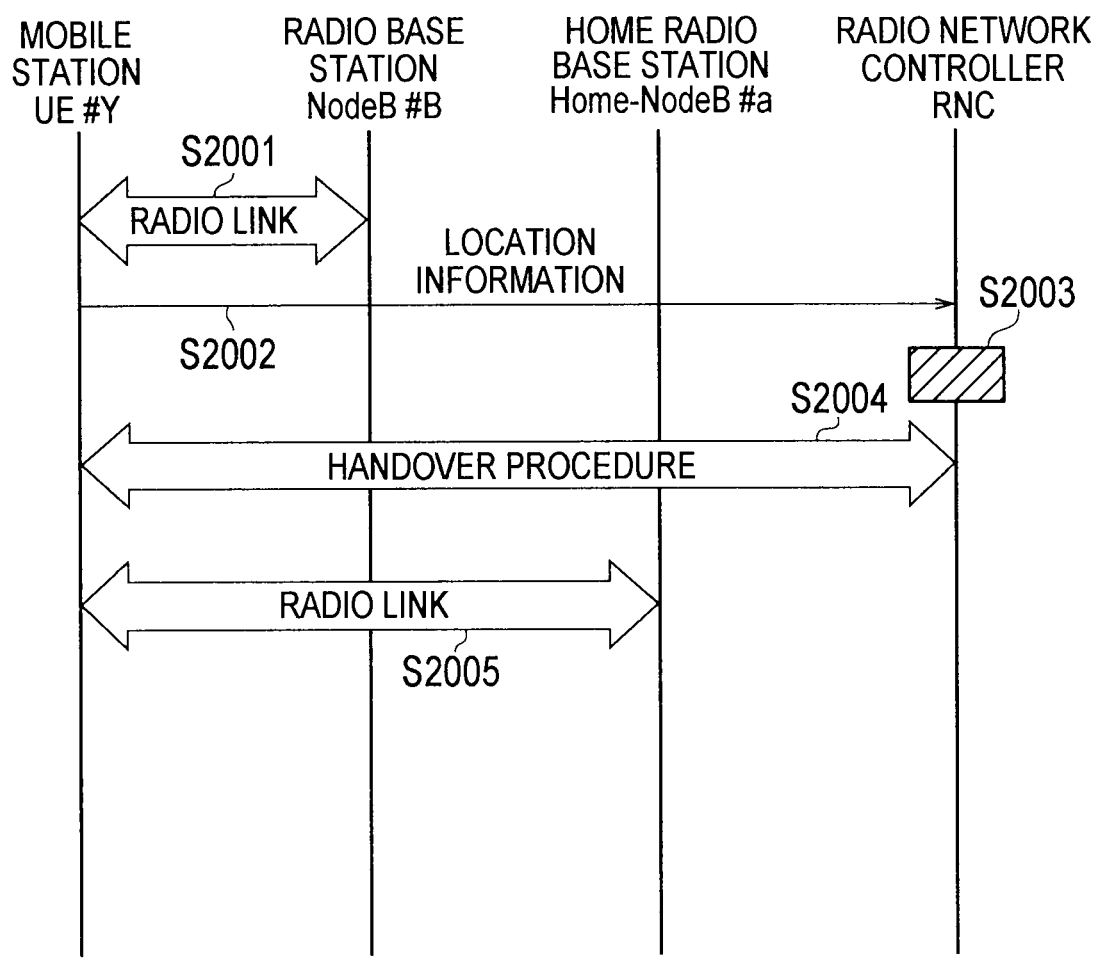
FIG. 6 is a sequence diagram illustrating a handover operation in the mobile communication system according to the first embodiment of the present invention.

Secondly, with reference to FIG. 6, a description is given of an operation carried out when the mobile station UE #Y (second mobile station) communicating via the macro cell #A using the same frequency f1 as the home cell #a enters the predetermined area near the home cell #a.

As shown in FIG. 6, in step S2001, the mobile station UE #Y has already established a radio link with a radio base station NodeB #A that manages the macro cell #A using the same frequency f1 as the home cell #a.

In step S2002, the mobile station UE #Y notifies the radio network controller RNC of location information on the mobile station UE #Y at a predetermined timing.

After determining in step S2003 that the mobile station UE #Y has entered the coverage area of the home cell #a, the radio network controller RNC instructs the mobile station UE #Y in step S2004 to perform handover (hard handover) to the home cell #a.

Then, in step S2005, in response to this instruction, the mobile station UE #Y releases the radio link established with the radio base station NodeB #A that manages the macro cell #A, and establishes a radio link with the home radio base station NodeB #a that manages the home cell #a.

Figure 7:
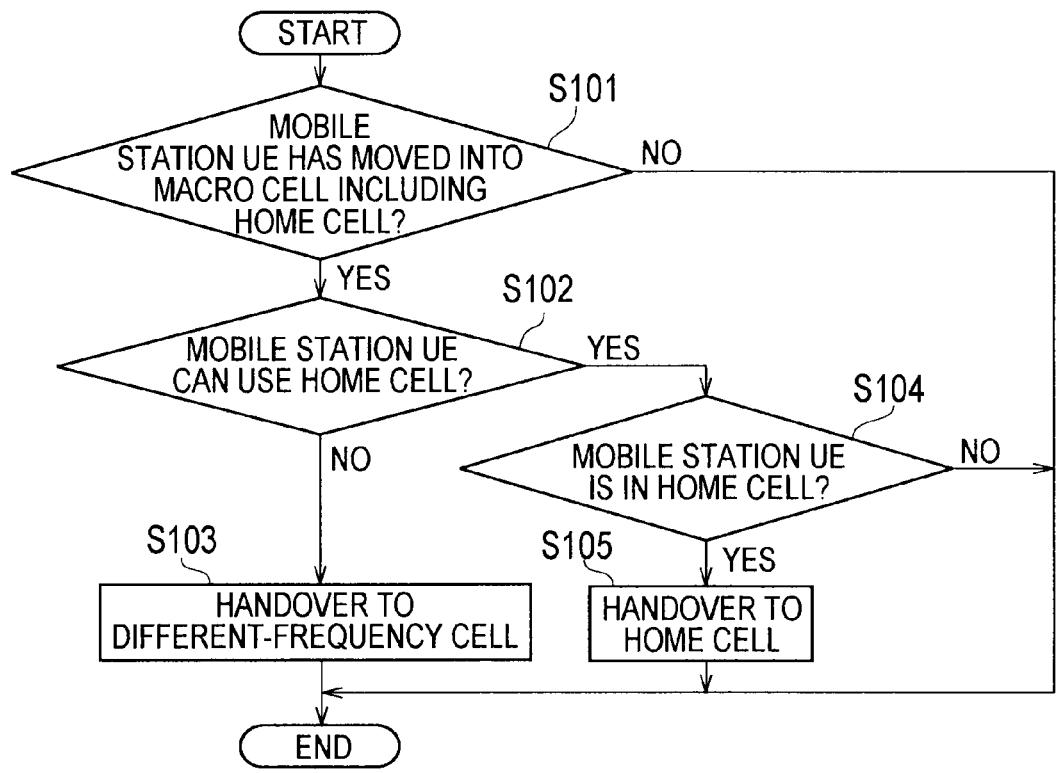
FIG. 7 is a flowchart illustrating an operation of the radio network controller during handover in the mobile communication system according to the first embodiment of the present invention.

Thirdly, with reference to FIG. 7, a description is given of a first operation of the radio network controller RNC of the mobile communication system according to this embodiment.

As shown in FIG. 7, in step S101, the radio network controller RNC determines whether or not the mobile station UE has moved into a macro cell including a home cell, that is, into the macro cell managed in association with the home cell.

If it is determined that the mobile station UE has moved into the macro cell, the operation proceeds to step S102, and if not, the operation is terminated.

In step S102, the radio network controller RNC determines whether or not the mobile station UE can use the home cell, that is, whether or not the mobile station UE is allowed access to the home cell.

If access is allowed, the operation proceeds to step S104, and if not, the operation proceeds to step S103.

In step S103, the radio network controller RNC makes the mobile station UE perform handover to a cell using a frequency different from that used in the home cell (different-frequency cell).

Meanwhile in step S104, the radio network controller RNC determines whether or not the mobile station UE is in the coverage area of the home cell.

If it is determined that the mobile station UE is in the area, the operation proceeds to step S105, and if not, the operation is terminated.

In step S105, the radio network controller RNC makes the mobile station UE perform handover to the home cell.

Figure 8:
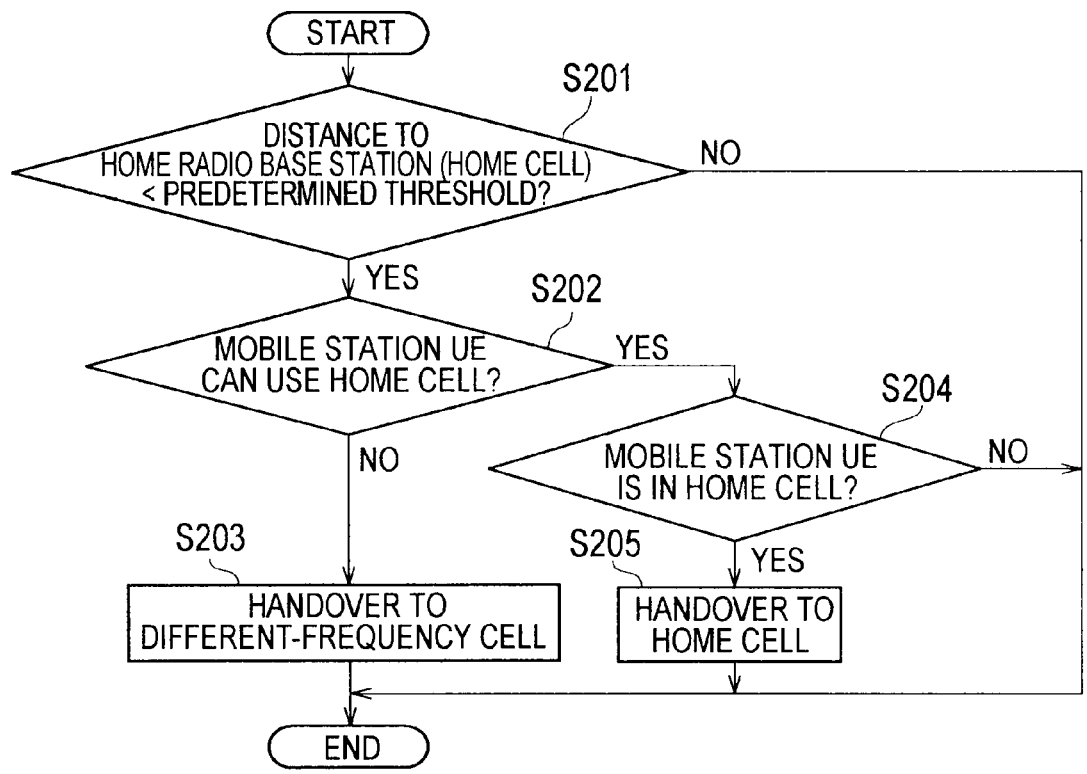
FIG. 8 is a flowchart illustrating an operation of the radio network controller during handover in the mobile communication system according to the first embodiment of the present invention.

Fourthly, with reference to FIG. 8, a description is given of a second operation of the radio network controller RNC of the mobile communication system according to this embodiment.

As shown in FIG. 8, in step S201, the radio network controller RNC determines whether or not the mobile station UE has moved into an area whose distance to the home radio base station (home cell) is not more than a predetermined threshold.

If it is determined that the mobile station UE has moved into the area, the operation proceeds to step S202, and if not, the operation is terminated.

The operation carried out through the following steps S203 to S205 is the same as the operation carried out through steps S103 to S105 in FIG. 7.

(Advantageous Effects of Mobile Communication System According to First Embodiment of Present Invention)

According to the mobile communication system of the first embodiment of the present invention, when the mobile station UE #X inaccessible to the home cell #a approaches the home cell #a while communicating via the macro cell #A using the same frequency f1 as the home cell #a, the mobile station UE #X is caused to perform handover to any of the macro cells #B to #D respectively using frequencies f2 to f4 that does not cause interference influencing the home cell #a. Thus, the mobile station UE #Y communicating via the home cell #a can be prevented from being influenced by interference.

In addition, according to the mobile communication system of the first embodiment of the present invention, since the mobile station UE #Y allowed exclusive use of the home cell #a is caused to use the home cell #a preferentially, communication capacity in the macro cell #A can be saved for the mobile station UE #X not allowed use of the home cell #a. Accordingly, when installing a small radio base station dedicated for a specific mobile station such as that for home use in a public communication area established by macro cells in advance, a common frequency can be used efficiently while ensuring communication quality and communication capacity of the public communication area.

(Mobile Communication System According to Second Embodiment of Present Invention)

With reference to FIGS. 9 to 13, a description is given of a mobile communication system according to a second embodiment of the present invention. Hereinbelow, the mobile communication system of this embodiment is described by focusing on differences from the aforementioned mobile communication system according to the first embodiment.

In the mobile communication system of this embodiment, as shown in FIG. 9, when a mobile station UE #Y (second mobile station) communicating via a macro cell #B using frequency f2 different from that used in a home cell #a enters a coverage area of the home cell #a, a cell change instruction unit 15 of a radio network controller RNC is configured to make the mobile station UE #Y perform handover to the home cell #a or to a macro cell #A using the same frequency f1 as the home cell #a.

For example, assume a case where the mobile station UE #Y enters a coverage area of a macro cell (macro cells #B, #C and #D in the example of FIG. 10) managed in association with the home area #a by a subordination manager 13 of the radio network controller RNC. A determination unit 14 of the radio network controller RNC carries out a measurement by the compressed mode for the mobile station UE#Y communicating via a macro cell using a frequency different from that used in the home cell #a, the measurement being made on the frequency f1 used in the home cell #a (or in the macro cell #A). Then, if a pilot signal of the frequency f1 transmitted from the home area #a (or from the macro cell #A) is observed, the determination unit 14 of the radio network controller RNC may be configured to transmit a notification by an RRC message or the like indicating that the mobile station UE #Y has entered a coverage area of the home cell #a (or the macro cell #A).

Figure 12:
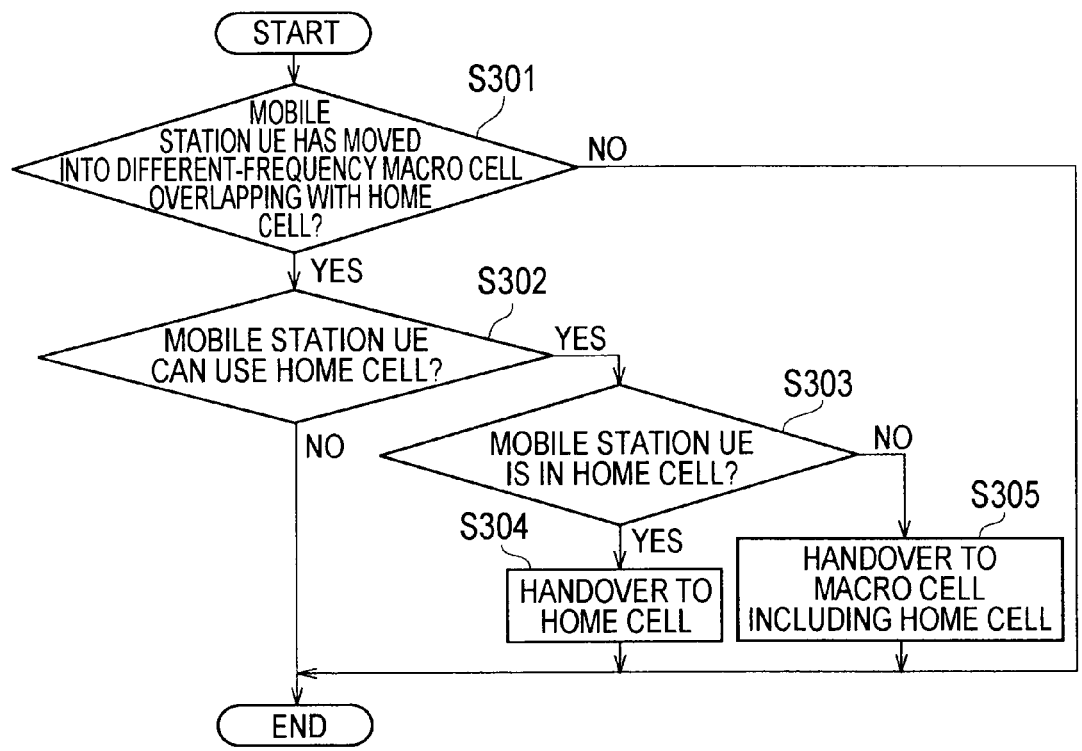
FIG. 12 is a flowchart illustrating an operation of the radio network controller during handover in the mobile communication system according to the second embodiment of the present invention.
Figure 13:
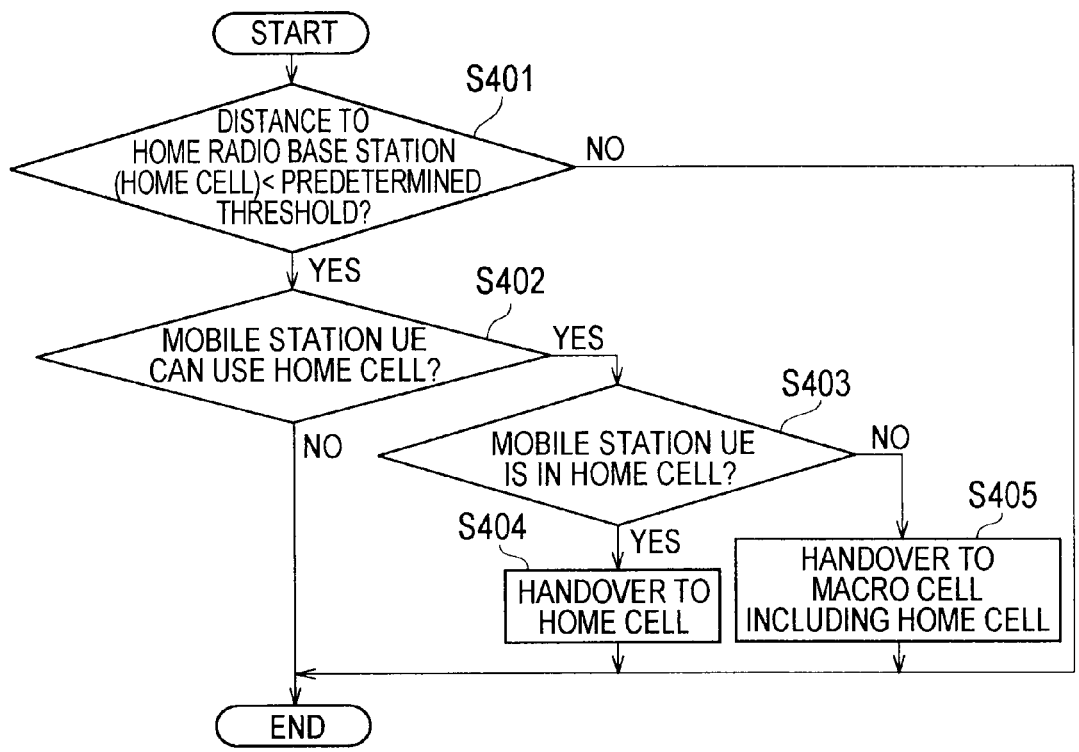
FIG. 13 is a flowchart illustrating an operation of the radio network controller during handover in the mobile communication system according to the second embodiment of the present invention.

Next, with reference to FIGS. 11 to 13, a description is given of an operation of the mobile communication system according to the second embodiment of the present invention.

Firstly, with reference to FIG. 11, a description is given of an operation carried out when the mobile station UE #Y (second mobile station) communicating via the macro cell #B using the frequency f2 different from that used in the home cell #a enters a predetermined area near the home cell #a (or a coverage area of the home cell #a).

As shown in FIG. 11, in step S3001, the mobile station UE #Y has already established a radio link with a radio base station NodeB #B that manages the macro cell #B using the frequency f2 different from that used in the home cell #a.

In step S3002, the mobile station UE #Y notifies the radio network controller RNC of location information on the mobile station UE #Y at a predetermined timing.

After determining in step S3003 that the mobile station UE #Y has entered the predetermined area near the home cell #a (or the coverage area of the home cell #a), the radio network controller RNC instructs the mobile station UE #Y in step S3004 to perform handover (hard handover) to the macro cell #A (or the home cell #a) which covers the predetermined area and which uses the same frequency f1 as the home cell #a.

Then, in step S3005, in response to this instruction, the mobile station UE #Y releases the radio link established with the radio base station NodeB #B that manages the macro cell #B, and establishes a radio link with a radio base station NodeB #A that manages the macro cell #A (or with a home radio base station Home-NodeB #a that manages the home cell #a).

Secondly, with reference to FIG. 12, a description is given of a first operation of the radio network controller RNC of the mobile communication system according to this embodiment.

As shown in FIG. 12, in step S301, the radio network controller RNC determines whether or not the mobile station UE has moved into a different-frequency macro cell overlapping with the home cell, that is, into a macro cell managed in association with the home cell and using a frequency different from that used in the home cell.

If it is determined that the mobile station UE has moved into the macro cell, the operation proceeds to step S302, and if not, the operation is terminated.

In step S302, the radio network controller RNC determines whether or not the mobile station UE can use the home cell, that is, whether or not the mobile station UE is allowed access to the home cell.

If access is allowed, the operation proceeds to step S304, and if not, the operation is terminated.

In step S303, the radio network controller RNC determines whether or not the mobile station UE is in the coverage area of the home cell.

If it is determined that the mobile station UE is in the area, the operation proceeds to step S304, and if not, the operation proceeds to step S305.

In step S304, the radio network controller RNC makes the mobile station UE perform handover to the home cell.

Meanwhile, in step S305, the radio network controller RNC makes the mobile station UE perform handover to a macro cell which covers an area covered by the home cell and uses the same frequency as the home cell.

Fourthly, with reference to FIG. 13, a description is given of a second operation of the radio network controller RNC of the mobile communication system according to this embodiment.

As shown in FIG. 13, in step S401, the radio network controller RNC determines whether or not the mobile station UE has moved into an area whose distance to the home radio base station (home cell) is not more than a predetermined threshold.

If it is determined that the mobile station UE has moved into the macro cell, the operation proceeds to step S402, and if not, the operation is terminated.

The operation carried out through the following steps S403 to S405 is the same as the operation carried out through steps S303 to S305 in FIG. 12.

According to the mobile communication system of the second embodiment of the present invention, since the mobile station UE #Y allowed use of the home cell #a is caused to use the home cell #a (or the macro cell #A using the same frequency f1 as the home cell #a) preferentially, communication capacity in the macro cells #B to #D can be saved for the mobile station UE #X not allowed use of the home cell #a.
(Modified Example 1)

Figure 14:
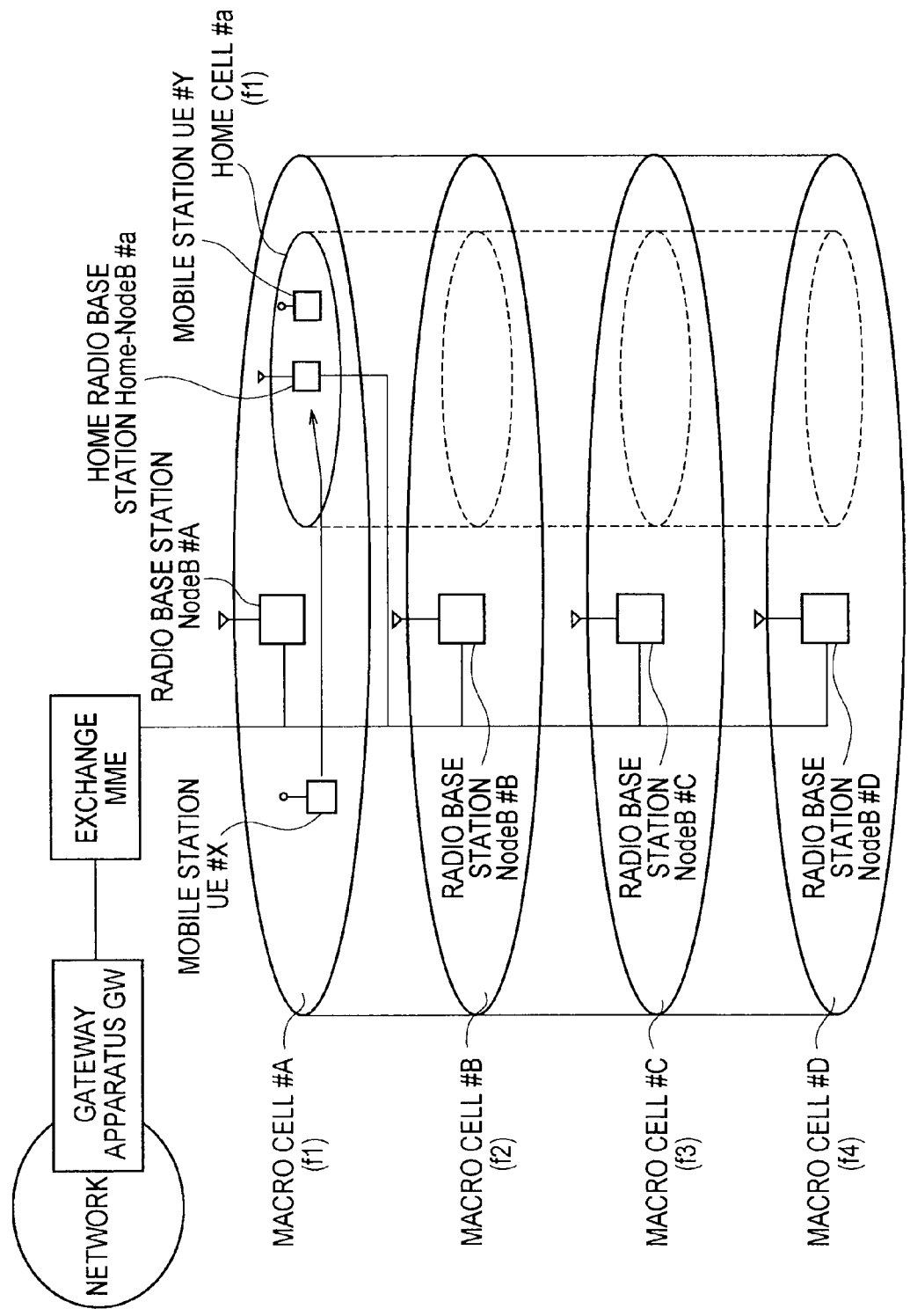
FIG. 14 is an entire configuration diagram of a mobile communication system according to Modified Example 1 of the present invention.

Although the above embodiment has been described by taking a W-CDMA type mobile communication system as an example, the present invention is not limited to this mobile communication system, and is also applicable to an LTE (Long Term Evolution) type mobile communication system, for example as shown in FIG. 14.

In this case, the above-mentioned function of the radio base station NodeB and that of the radio network controller RNC are installed in a radio base station eNB or an exchange MME. Here, in this modified example, the radio base station eNB or the exchange MME is configured to serve as the above network device.

Additionally, a subordination manager 13 of the exchange MME is configured to identify each cell (macro cell and home cell) by use of a "Tracking Area ID."

To be specific, as shown in FIG. 14, in the mobile communication system according to Modified Example 1, radio base stations NodeB #A to NodeB #D and a home radio base station Home-NodeB #a are accommodated in the exchange MME.

For example, when it is determined that a mobile station UE #X communicating via a macro cell #A using the same frequency f1 as a home cell #a has entered a predetermined area near the home cell #a, a cell change instruction unit 15 of a radio base station eNB #A is configured to make the mobile station UE #X perform handover (hard handover) to a different-frequency macro cell which covers the predetermined area and which is selected from among macro cells #B to #D using frequencies f2 to f4 different from that used in the home cell #a.

In addition, when it is determined that a mobile station UE #Y communicating via the macro cell #A using the same frequency f1 as the home cell #a has entered a coverage area of the home cell #a, the cell change instruction unit 15 of the radio base station eNB #A is configured to make the mobile station UE #Y perform handover (hard handover) to the home cell #a.
(Modified Example 2)

Figure 15:
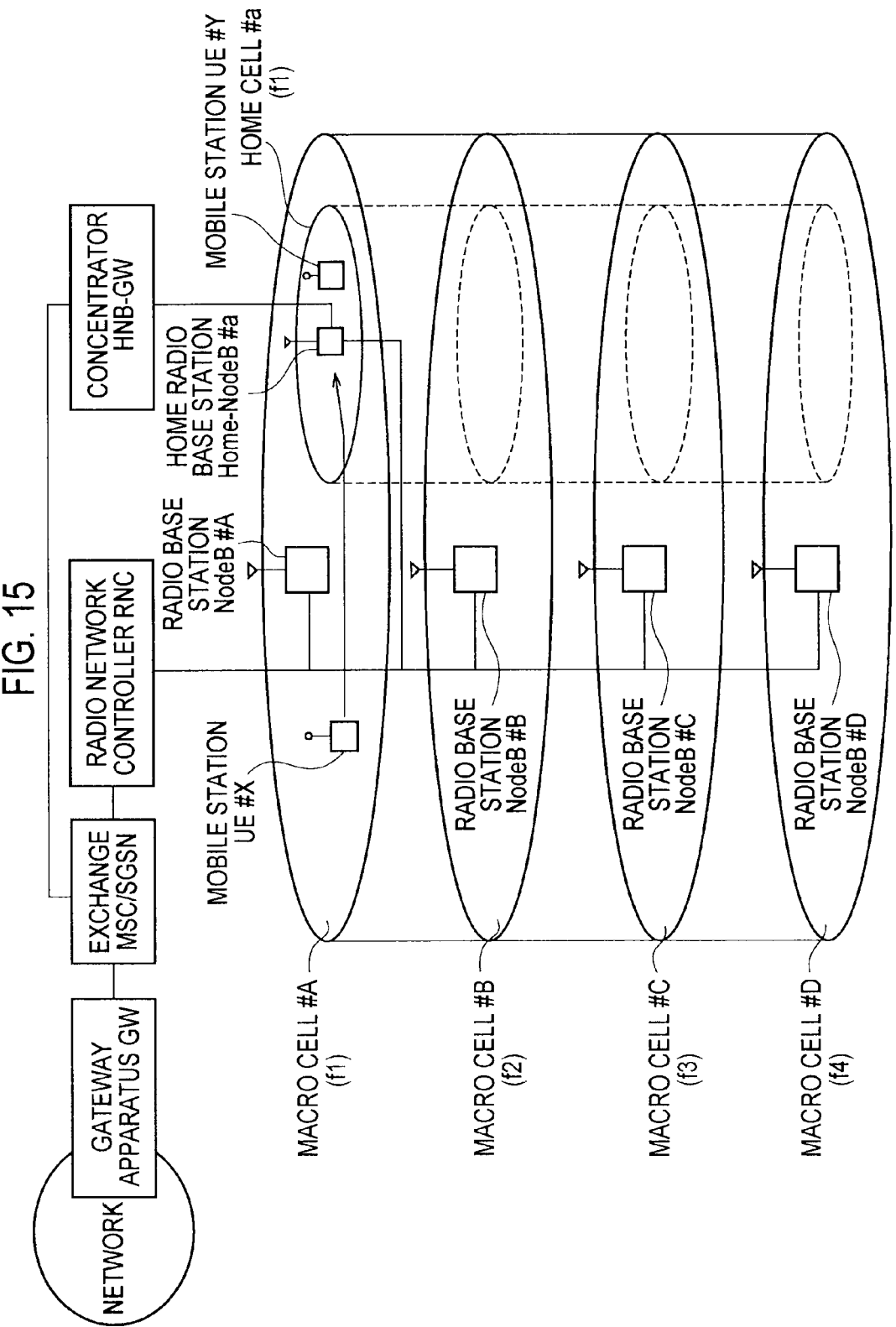
FIG. 15 is an entire configuration diagram of a mobile communication system according to Modified Example 2 of the present invention.

With reference to FIG. 15, a description is given below of a mobile communication system according to Modified Example 2 of the present invention by focusing on differences from the above mobile communication system according to the first embodiment.

As shown in FIG. 15, in the mobile communication system according to Modified Example 2, radio base stations NodeB #A to NodeB #D are accommodated in a radio network controller RNC, and a home radio base station Home-NodeB #a is accommodated in a concentrator HNB-GW.

In this Modified Example 2, an exchange MSC/SGSN, the radio network controller RNC or the concentrator HNB-GW is configured to serve as the network device described above. That is, the function of the radio network controller RNC shown in FIG. 2 is installed to any one of the exchange MSC/SGSN, the radio network controller RNC and the concentrator HNB-GW.
(Modified Example 3)

Figure 16:
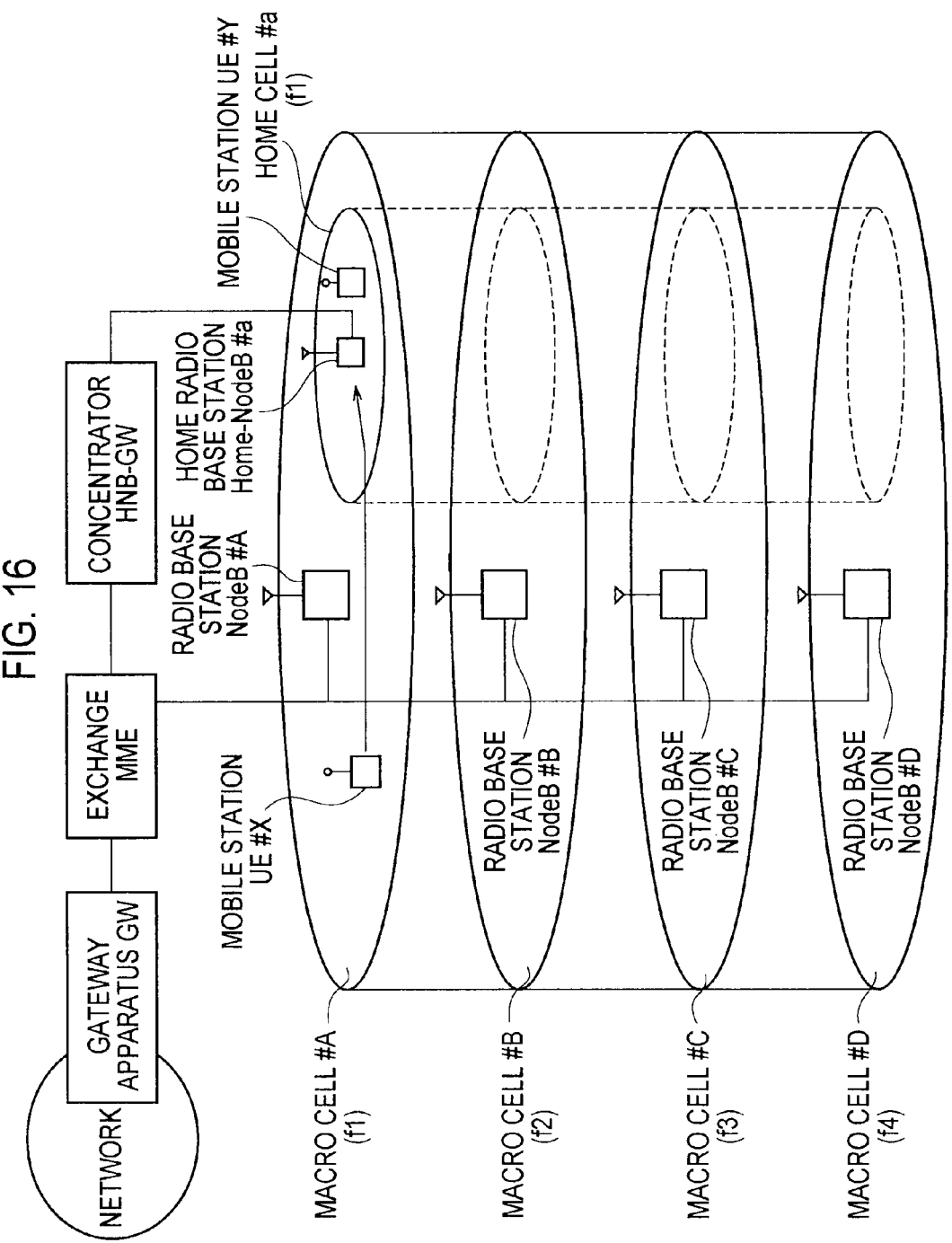
FIG. 16 is an entire configuration diagram of a mobile communication system according to Modified Example 3 of the present invention.

With reference to FIG. 16, a description is given below of a mobile communication system according to Modified Example 3 of the present invention by focusing on differences from the above mobile communication system according to the first embodiment.

As shown in FIG. 16, the mobile communication system according to Modified Example 3 is an LTE type mobile communication system in which radio base stations NodeB #A to NodeB #D are accommodated in an exchange MME, and a home radio base station Home-NodeB #a is accommodated in a concentrator HNB-GW.

In this Modified Example 3, the exchange MME or the concentrator HNB-GW is configured to serve as the network device described above. That is, the function of the radio network controller RNC shown in FIG. 2 is installed to any one of the exchange MME and the concentrator HNB-GW.
(Modified Example 4)

Figure 17:
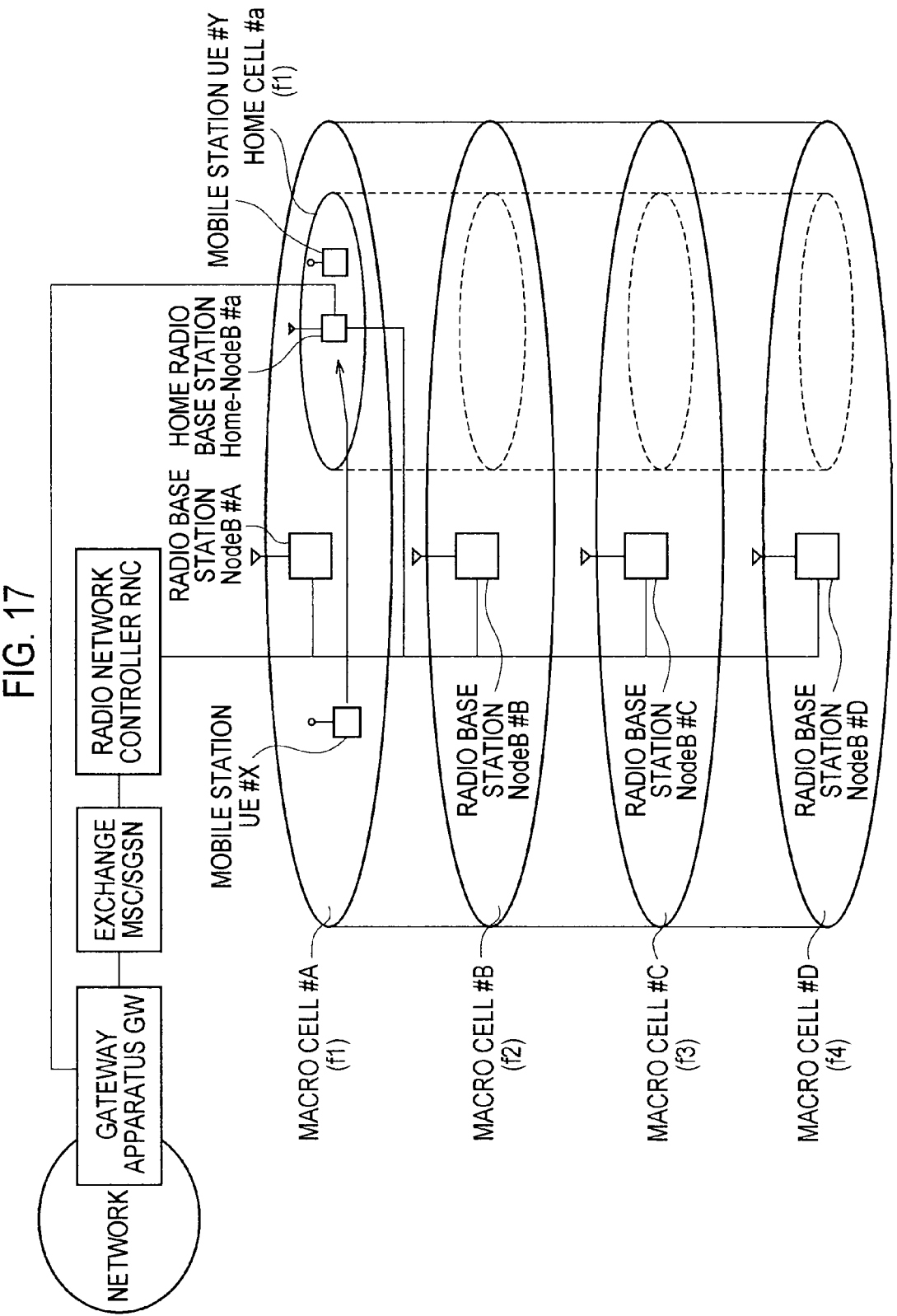
FIG. 17 is an entire configuration diagram of a mobile communication system according to Modified Example 4 of the present invention.
Figure 18:
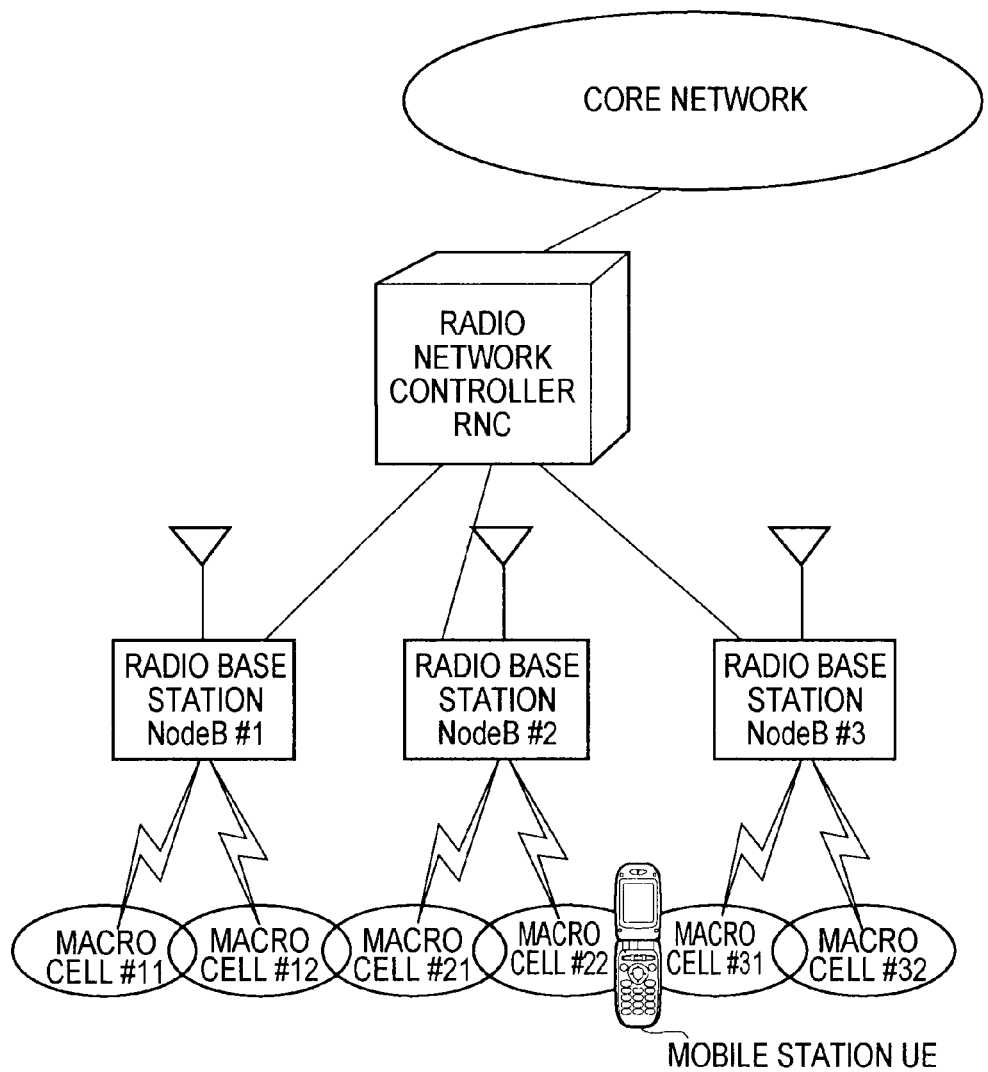
FIG. 18 is an entire configuration diagram of a conventional mobile communication system.
Figure 19:
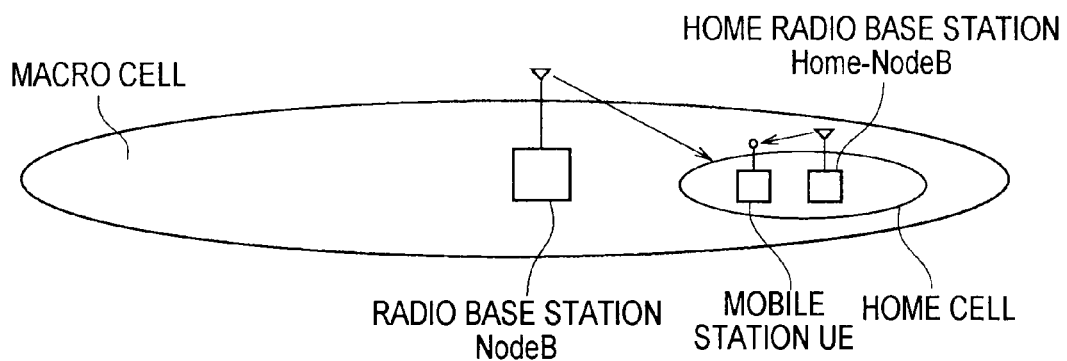
FIG. 19 is a diagram for explaining a problem in the conventional mobile communication system.

With reference to FIG. 17, a description is given below of a mobile communication system according to Modified Example 4 of the present invention by focusing on differences from the above mobile communication system according to the first embodiment.

As shown in FIG. 1, in the mobile communication system according to Modified Example 4, radio base stations NodeB #A to NodeB #D are accommodated in a radio network controller RNC, and a home radio base station Home-NodeB #a is accommodated in a gateway apparatus GW.

In this Modified Example 4, the radio network controller RNC is configured to serve as the network device described above. That is, the function of the radio network controller RNC shown in FIG. 2 is installed to any one of the exchange MSC/SGSN and the home radio base station Home-NodeB #a.

Additionally, in the mobile communication system according to Modified Example 4, the home radio base station Home-NodeB #a may include the function of the radio network controller RNC shown in FIG. 2.

In this case, the home radio base station Home-NodeB #a is configured to manage frequency f1 used in the home cell #a as well as frequencies f1 to f4 used in the neighboring macro cells #A to #D, respectively.

Here, the operation of the above-mentioned mobile station UE, radio base stations NodeB or eNB, home radio base station Home-NodeB, exchange MME or MSC/SGSN, radio network controller RNC, concentrator HNB-GW, and gateway apparatus GW may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the mobile station UE, the radio base stations NodeB or eNB, the home radio base station Home-NodeB, the exchange MME or MSC/SGSN, the radio network controller RNC, the concentrator HNB-GW, and the gateway apparatus GW. Alternatively, the storage medium and the processor may be provided in the mobile station UE, the radio base stations NodeB or eNB, the home radio base station Home-NodeB, the exchange MME or MSC/SGSN, the radio network controller RNC, the concentrator HNB-GW, and the gateway apparatus GW as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

Industrial Applicability

As described above, the present invention provides a mobile communication system and a network device which are capable of suppressing influence by an interference wave between a home cell and a macro cell when the home cell is located within a coverage area of the macro cell, and promoting access to the home cell.

The invention claimed is:

1. A mobile communication system, comprising:
  a home radio base station which provides a home cell, wherein the home cell restricts access from a first mobile station;
  a macro radio base station which provides a macro cell, wherein the home cell is within a coverage area of the macro cell; and
  a device that includes a cell change instruction unit configured to, when the first mobile station communicating via the macro cell using a same frequency as the home cell enters within a predetermined area whose distance to the home cell is not more than a predetermined threshold, cause the first mobile station to perform handover to a different-frequency macro cell selected from among macro cells covering the predetermined area and using frequencies different from that used in the home cell.

2. The mobile communication system according to claim 1, wherein
  the home cell and a macro cell that covers at least a part of a coverage area of the home cell are managed in association with each other, and
  the predetermined area is an area covered by the macro cell managed in association with the home cell.

3. The mobile communication system according to claim 1, wherein the different-frequency macro cell is selected depending on the number of home cells each overlapping therewith.

4. A mobile communication system according to claim 1, wherein
  the home cell allows access from a second mobile station, and
  when the second mobile station communicating via a macro cell using a frequency different from that used in the home cell enters a coverage area of the home cell, the device causes the second mobile station to perform handover to any one of the home cell and a macro cell using the same frequency as the home cell.

5. A network device used in a mobile communication system including a home cell configured to restrict access from a first mobile station, the network device comprising:
  a cell change instruction unit configured to, when the first mobile station communicating via a macro cell using a same frequency as the home cell enters a predetermined area whose distance to the home cell is not more than a predetermined threshold, cause the first mobile station perform handover to a different-frequency macro cell selected from among macro cells covering the predetermined area and using frequencies different from that used in the home cell, wherein the home cell is within a coverage area of the macro cell.

6. The network device according to claim 5, comprising
  a subordination manager configured to manage the home cell and a macro cell that covers at least a part of a coverage area of the home cell in association with each other, wherein
  the predetermined area is an area covered by the macro cell managed in association with the home cell.

7. The network device according to claim 5, wherein the cell change instruction unit selects the different-frequency macro cell depending on the number of home cells each having a coverage area overlapping therewith.

8. The network device according to claim 5 wherein the home cell is configured to allow access from a second mobile station, and
  cell change instruction unit is configured to, when the second mobile station communicating via a macro cell using a frequency different from that used in the home cell enters a coverage area of the home cell, make the second mobile station perform handover to any one of the home cell and a macro cell using the same frequency as the home cell.

9. A home radio base station managing a home cell configured to restrict access from a first mobile station, the home radio base station comprising:
  a cell change instruction unit configured to, when the first mobile station communicating via a macro cell using a same frequency as the home cell enters a predetermined area whose distance to the home cell is not more than a predetermined threshold cause the first mobile station perform handover to a different-frequency macro cell selected from among macro cells covering the predetermined area and using frequencies different from that used in the home cell, wherein the home cell is within a coverage area of the macro cell.

10. The home radio base station according to claim 9 comprising a subordination manager configured to manage the home cell and a macro cell that covers at least a part of a coverage area of the home cell in association with each other, wherein
  the predetermined area is an area covered by the macro cell managed in association with the home cell.

11. The home radio base station according to claim 9, wherein the cell change instruction unit selects the different-frequency macro cell depending on the number of home cells each having a coverage area therewith.

* * * * *